United States Patent
Gillette et al.

(10) Patent No.: US 10,343,307 B2
(45) Date of Patent: Jul. 9, 2019

(54) METHOD OF MAKING INTERLOCKING JOINT FOR PILE ENCAPSULATION JACKETS

(71) Applicant: ATS Products, Inc., Richmond, CA (US)

(72) Inventors: Karl Gillette, Richmond, CA (US); Doug Williams, San Rafael, CA (US)

(73) Assignee: ATS Products, Inc., Richmond, CA (US)

( * ) Notice: Subject to any disclaimer, the term of this patent is extended or adjusted under 35 U.S.C. 154(b) by 163 days.

(21) Appl. No.: 15/396,305

(22) Filed: Dec. 30, 2016

(65) Prior Publication Data

US 2017/0190103 A1    Jul. 6, 2017

Related U.S. Application Data

(60) Provisional application No. 62/274,004, filed on Dec. 31, 2015.

(51) Int. Cl.
*B32B 41/00*    (2006.01)
*B29C 35/02*    (2006.01)
(Continued)

(52) U.S. Cl.
CPC .......... *B29C 35/02* (2013.01); *B29C 63/0073* (2013.01); *B29C 65/48* (2013.01); *B29C 65/56* (2013.01); *B29C 66/004* (2013.01); *B29C 66/1122* (2013.01); *B29C 66/12441* (2013.01); *B29C 66/12469* (2013.01); *B29C 66/4722* (2013.01); *B29C 66/5326* (2013.01); *B29C 66/721* (2013.01); *B29C 66/73753* (2013.01); *B29C 66/73941* (2013.01);
(Continued)

(58) Field of Classification Search
CPC ..... B29C 35/02; B29C 63/0073; B29C 65/48; B29C 2063/485; B29C 2063/022; B29C 66/73753; B29C 66/73941; B29C 65/56; B29C 66/721; B29C 66/5326; B29C 66/4722; B29C 66/12469; B29C 66/12441; B29C 66/1122; B29C 66/004; B29C 66/1248; B29C 66/61; B29C 66/81461; B29L 2031/10; B29L 2023/22; B29K 2105/243
USPC .............. 156/60, 64, 70, 350, 315, 378, 379
See application file for complete search history.

(56) References Cited

U.S. PATENT DOCUMENTS 4,023,374 A  *  5/1977  Colbert .................... E02D 5/64
                                                        138/159

* cited by examiner

*Primary Examiner* — Michael N Orlando
*Assistant Examiner* — Joshel Rivera
(74) *Attorney, Agent, or Firm* — Kilpatrick Townsend Stockton & LLP (57) ABSTRACT

Embodiments provide a method for forming a groove on a pile encapsulation jacket to form an interlocking joint on the pile encapsulation jacket. A spacer may be used to form the groove. First, a pile jacket laminate is formed on a mandrel surface. The pile jacket laminate may be partially cured to have a solid but sticky surface. The spacer may be placed on the pile jacket laminate. An additional layer of laminate may be formed on at least a portion of the pile jacket laminate and at least a portion of the spacer. The entire structure may be cured and the spacer may be removed. A groove is formed between the pile jacket laminate and the additional layer of laminate at a space previously occupied by the spacer. The groove has the same width as the portion of the spacer that was covered with the additional layer of laminate.

19 Claims, 4 Drawing Sheets

(51) Int. Cl.
  *B29C 65/48* (2006.01)
  *B29C 63/00* (2006.01)
  *B29L 23/00* (2006.01)
  *B29C 65/56* (2006.01)
  *B29C 65/00* (2006.01)
  *B29K 105/24* (2006.01)
  *B29C 63/02* (2006.01)
  *B29C 63/48* (2006.01)
  *B29L 31/10* (2006.01)

(52) U.S. Cl.
  CPC .. *B29C 2063/022* (2013.01); *B29C 2063/485* (2013.01); *B29K 2105/243* (2013.01); *B29L 2023/22* (2013.01); *B29L 2031/10* (2013.01)

METHOD OF MAKING INTERLOCKING JOINT FOR PILE ENCAPSULATION JACKETS

This application claims priority to U.S. Provisional Patent Application No. 62/274,004, filed Dec. 31, 2015, entitled "METHOD OF MAKING INTERLOCKING JOINT FOR PILE ENCAPSULATION JACKETS," the disclosure of which is hereby incorporated by reference in its entirety for all purposes.

BACKGROUND

Pile encapsulation is a technique used to protect and/or repair the body of a pile carrying a structure. The piles may be used underwater, underground and/or above ground. Pile encapsulation may include a jacket, such as a fiberglass jacket, provided around the pile to reinforce the structure of the pile or to provide a safe environment for the repair of the pile. The jacket may be secured around the pile. Fasteners may be provided around the jacket to ensure that the jacket stays wrapped around the pile. Depending on the application, a cementitious or polymer based filler may be placed in the annular space between the jacket and the pile to ensure contact therebetween.

BRIEF SUMMARY

Embodiments provide a method for forming a groove on a pile encapsulation jacket to form an interlocking joint on the pile encapsulation jacket. In some embodiments, a spacer (e.g. silicone rubber spacer) is used to form the groove. First, a pile jacket laminate is formed on a surface of a mandrel. The pile jacket laminate may be formed of multiple coats of laminate material. After the final coat of laminate is formed on the mandrel, the pile jacket laminate may be partially cured to have a hardened but sticky surface. The spacer may be placed on the pile jacket laminate. If a silicone rubber spacer is used, the spacer may stay in place due to the sticky surface of the partially cured pile jacket laminate. An additional layer of laminate may be formed on at least a portion of the pile jacket laminate and at least a portion of the spacer. The entire structure may be cured and the spacer may be now removed. A groove is now formed between the pile jacket laminate and the additional layer of laminate. The groove has the same width as the portion of the spacer that was covered with the additional layer of laminate.

In some embodiments, the spacer may have a first level raised from a second level by a predetermined amount such that the first level is thicker than the second level. The second level of the spacer may be covered with the additional layer of laminate. Thus, when the spacer is removed, the groove has the same width as the width of the second level of the spacer. The pile jacket laminate may be cut in a longitudinal direction at a predetermined distance from a terminal end of the additional layer of laminate to form the pile jacket. The pile jacket may be provided around a pile and secured in place by inserting a longitudinal edge portion of the pile jacket in the groove formed on the opposite longitudinal edge portion.

In some embodiments, a method is provided for making an interlocking joint for a pile encapsulation jacket is provided. The method comprises forming a first layer of pile jacket laminate on a surface of a mandrel. The first layer of the pile jacket laminate is partially cured. A spacer is placed on the partially cured first layer of pule jacket laminate. A second layer of the pile jacket laminate is formed on at least a portion of the first layer of pile jacket laminate and a portion of the spacer. The second layer of pile jacket laminate is cured. The spacer is removed to form an interlocking joint including a groove. The groove is formed between the first layer of the pile jacket laminate and the second layer of the pile jacket laminate at a space previously occupied by the spacer.

These and other embodiments are described in further detail below.

DETAILED DESCRIPTION

Piles are heavy beams or posts driven vertically into the bed of a river, soft ground, etc., to support the foundations of a structure. The piles may be used underwater, underground and/or above ground. Often, the piles are surrounded by an encapsulation (e.g. an encapsulation jacket) to protect or to provide a safe environment for the repair of the pile. According to various embodiments, the jacket may be secured around the pile by interconnecting two opposite edge portions of the jacket. An interconnecting mechanism may be formed on one or both edge portions of the jacket.

Embodiments provide a method for forming a groove on a pile encapsulation jacket to form an interlocking joint on the pile encapsulation jacket. In some embodiments, the groove may be formed on a first longitudinal edge portion of the jacket. The second longitudinal edge portion of the jacket may go around a pile and may be inserted in the groove formed on the opposite longitudinal edge portion of the jacket thereby forming the interlocking joint.

In some embodiments, a flexible spacer is used to form the groove. The spacer may be moldable and made of material that does not bond with resin material. In some embodiments, the spacer may be made of an elastomer. For example, the flexible spacer may be made of silicone rubber, rubber strip or a rubber sheet.

According to various embodiments, a pile jacket laminate is formed on a surface of a mandrel. The pile jacket laminate may be formed of multiple coats of laminate material. After the final coat of laminate is formed on the mandrel, the pile jacket laminate may be partially cured to have a hardened and sticky surface. The flexible spacer may be placed on the pile jacket laminate. In some embodiments, the flexible spacer may have a same length as the pile jacket laminate. An additional layer of laminate may be formed on at least a portion of the pile jacket laminate and at least a portion of the flexible spacer. The additional layer of laminate may have the same length as the pile jacket laminate and the flexible spacer. The entire structure may be cured and the flexible spacer may be removed leaving a hollow cavity (e.g. a groove) formed between the pile jacket laminate and the additional layer of laminate. The groove corresponds to the space that the flexible spacer was occupying prior to being removed. The groove has the same width as the portion of the flexible spacer that was covered with the additional layer of laminate.

For example, the flexible spacer may have a first level raised from a second level by a predetermined amount such that the first level is thicker than the second level as measured from a base of the flexible spacer. During the making of the interlocking joint on the pile encapsulation jacket, the second level of the flexible spacer may be covered with the additional layer of laminate (after the flexible spacer is positioned on the pile laminate (e.g. the pile encapsulation jacket). The difference in height between the first level and the second level of the spacer (e.g. a side surface of the first level raised from the second level) may serve as a stop for the additional layer of laminate such that the additional layer of laminate covers the second level of the spacer and stops at where the second level meets the first level. As such, when the flexible spacer is removed, the groove has the same width as the width of the second level of the flexible spacer. The pile jacket laminate may be cut in a longitudinal direction at a predetermined distance from a terminal end of the additional layer of laminate to form the pile jacket. In some embodiments, the pile jacket laminate may be cut in a longitudinal direction at a predetermined distance from the stop of the spacer. The pile jacket may be provided around a pile and secured in place by inserting a first longitudinal edge portion of the pile jacket in the groove formed on a second longitudinal edge portion opposite from the first longitudinal edge portion.

Figure 1A:
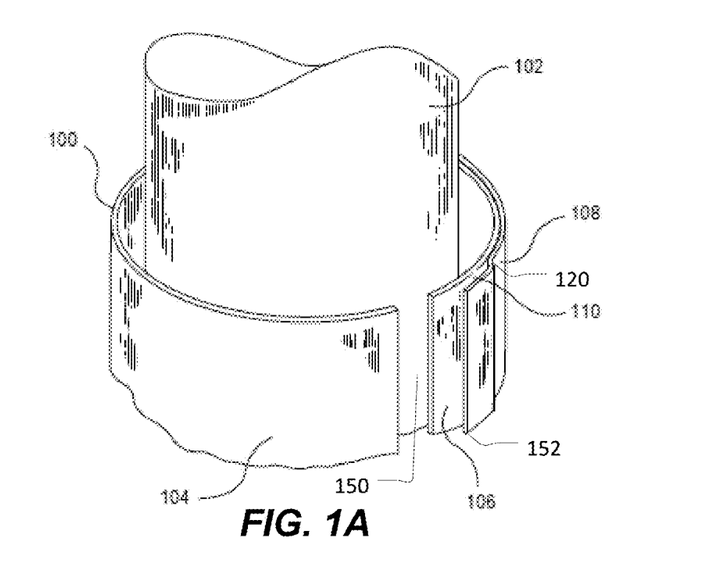
FIG. 1A illustrates an exemplary pile encapsulation jacket in accordance with embodiments of the invention.

FIG. 1A illustrates an exemplary pile encapsulation jacket 100 in accordance with embodiments of the invention. The pile encapsulation jacket 100 has a first longitudinal edge portion 104 and a second longitudinal edge portion 106 opposite from the first longitudinal edge portion 104. The first longitudinal edge portion 104 and the second longitudinal edge portion 106 may be formed, for example, by cutting (e.g. with a blade or a laser) a pile encapsulation jacket laminate in a longitudinal direction or otherwise forming a slit 150 on the pile encapsulation jacket 100. The pile encapsulation jacket 100 may be formed of multiple layers of material, such as fiberglass-reinforced resin material, which may comprise a resin (e.g. polyester, isopthalic polyester, vinylester or epoxy), and layers of any suitable type of reinforcing fiber such as fiberglass (e.g. woven, unidirectional or random strand mat) or other suitable filler material to form a laminate. The layers of the pile encapsulation jacket 100 are discussed below in greater detail in connection with FIG. 2B.

Still referring to FIG. 1A, an extra layer of laminate 108 may be formed on at least a portion of the pile encapsulation jacket 100 along the second longitudinal edge portion 106. The extra layer of laminate 108 may have a step profile 120 such that a groove 110 (e.g. a hollow cavity) is formed between at least a portion of the extra layer of laminate 108 and the second longitudinal edge portion 106 of the pile encapsulation jacket 100. The process for forming the groove 110 on the pile encapsulation jacket 100 is discussed below in greater detail in connection with FIG. 5.

Figure 1B:
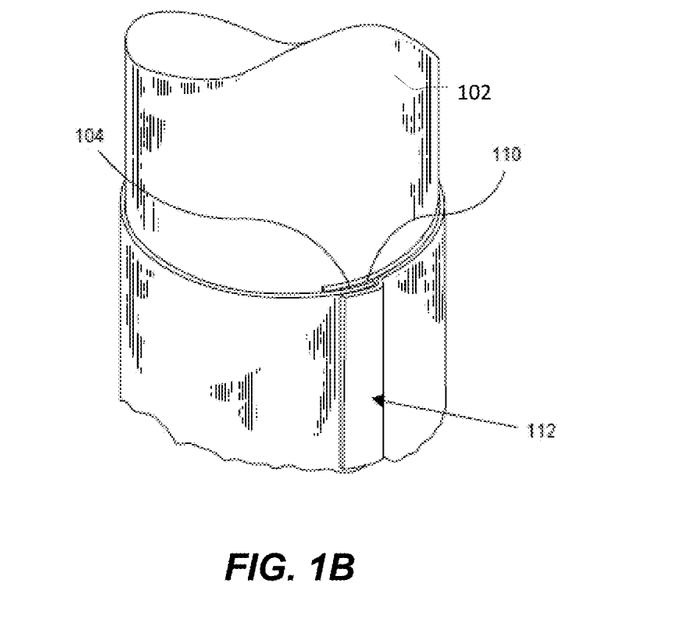
FIG. 1B illustrates the exemplary pile encapsulation jacket illustrated in FIG. 1A wrapped around a pile using an interlocking joint in accordance with embodiments of the invention.

FIG. 1B illustrates the exemplary pile encapsulation jacket 100 wrapped around a pile 102 using an interlocking joint 112 in accordance with embodiments of the invention. Upon wrapping the pile encapsulation jacket 100 around the pile 102, the first longitudinal edge portion 104 of the pile encapsulation jacket 100 can be inserted into the groove 110 formed on an exterior surface of the second longitudinal edge portion 106 of the pile encapsulation jacket 100 to form the interlocking joint 112. The groove 110 extends along the exterior surface of the second longitudinal edge portion 106 of the pile encapsulation jacket 100. Depending on the environment where the pile encapsulation jacket 100 is used, additional fasteners may be provided around the pile encapsulation jacket 100 and/or the interlocking joint 112. In some embodiments, additional fastener material (e.g. temporary or removable adhesive) may be provided in the groove 110 to enhance the hold between the first longitudinal edge portion 104 and the second longitudinal edge portion 106 of the pile encapsulation jacket 100. The additional fastener material may be of type that can be removed when the longitudinal edge portion 104 and the second longitudinal edge portion 106 are disengaged from each other.

In some embodiments, adhesive material may be applied to the groove 110 prior to inserting the first longitudinal edge portion 104 of the pile encapsulation jacket 100 into the groove 110. In such embodiments, when the first longitudinal edge portion 104 of the pile encapsulation jacket 100 is inserted into the groove 110, the first longitudinal edge portion 104 of the pile encapsulation jacket 100 may adhere to a top surface of the second longitudinal edge portion 106 of the pile encapsulation jacket 100 to form the interlocking joint 112. In some embodiments, the adhesive material may be temporary (e.g. may evaporate after a predetermined amount of time) or may be removable such that the longitudinal edge portion 104 and the second longitudinal edge portion 106 may be disengaged from each other when desired.

Figure 2A:
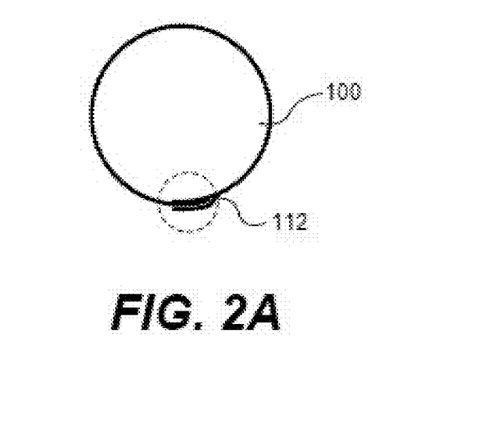
FIG. 2A illustrates top view of an exemplary pile encapsulation jacket with an interlocking joint in accordance with embodiments of the invention.
Figure 2B:
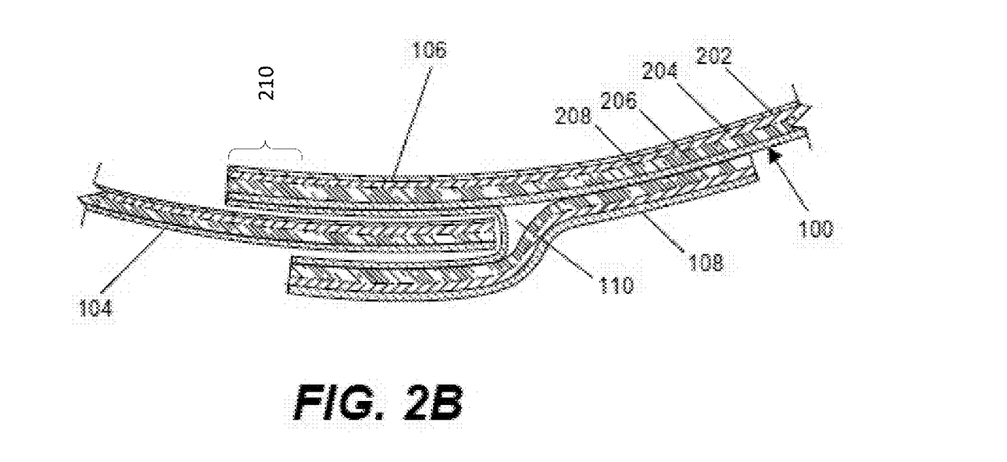
FIG. 2B illustrates detailed top view of the interlocking joint portion of the exemplary pile encapsulation jacket illustrated in FIG. 2A in accordance with embodiments of the invention.

FIG. 2A illustrates top view of the pile encapsulation jacket 100 with the interlocking joint 112 in accordance with embodiments of the invention. FIG. 2B illustrates detailed top view of the interlocking joint 112 of the exemplary pile encapsulation jacket 100 in accordance with embodiments of the invention. According to various embodiments, each one of the pile encapsulation jacket 100 and the extra layer of laminate 108 may be formed of multiple layers of material. That is, each one of the pile encapsulation jacket 100 and the extra layer of laminate 108 may include multiple sublayers (e.g. multiple sublayers of resin or fiberglass). For example, the pile encapsulation jacket 100 may be formed of multiple sublayers of fiberglass-reinforced resin material, which may comprise a resin (e.g. polyester, isopthalic polyester, vinylester, phenol formaldehyde or epoxy), and sublayers of any suitable type of reinforcing fiber such as fiberglass (e.g. woven, unidirectional or random strand mat) or other suitable filler material to form a laminate.

Any suitable resins may be used in embodiments of the invention. Suitable resins may include thermoset resins such as epoxy, vinylester, phenol formaldehyde, isopthalic polyester, or polyester thermosetting plastics.

Any suitable fiber material may be used in embodiments of the invention. In some embodiments, a fabric material may be used and may include glass, random glass mat, unidirectional or random strand mat, woven roving, boat cloth, filament winding, or organic (or inorganic) veils as subsequent layers of glass in order to achieve the appropriate wall thicknesses required, based on the predetermined dimensions.

In the exemplary embodiment illustrated in FIG. 2B, the pile encapsulation jacket 100 is formed of a first layer of resin and/or reinforcing fiber 202, a second layer of resin and/or reinforcing fiber 204, a third layer of resin and/or reinforcing fiber 206 and a fourth layer of resin and/or reinforcing fiber 208. In some embodiments, a total thickness of the pile encapsulation jacket 100 (formed of one or more layers) may be between about 1/16 inch to about 3/8 inch. The layers 202, 204, 206 and 208 may be referred as the sublayers of the pile jacket laminate.

The embodiment shown in FIG. 2B illustrates the first longitudinal edge portion 104 of the pile encapsulation jacket 100 being inserted into (e.g. being received within) the groove 110 formed between the second longitudinal edge portion 106 of the pile encapsulation jacket 100 and the extra layer of laminate 108. According to various embodiments, the extra layer of laminate 108 may be about 6 inches wide while the groove 110 may be about 2 inches wide (in a circumferential direction). The second longitudinal edge portion 106 of the pile encapsulation jacket 100 may extend about 1 inch beyond the groove so as to form a lip section 210. The lip section 210 may guide the first longitudinal edge portion 104 of the pile encapsulation jacket 100 into the groove 110 and may provide a larger overlapping portion for the first longitudinal edge portion 104 and second longitudinal edge portion 106 of the pile encapsulation jacket 100. It is understood that the above-described dimensions are merely exemplary and dimensions that are smaller or larger than the provided dimensions can be used in other embodiments of the invention.

Figure 3:
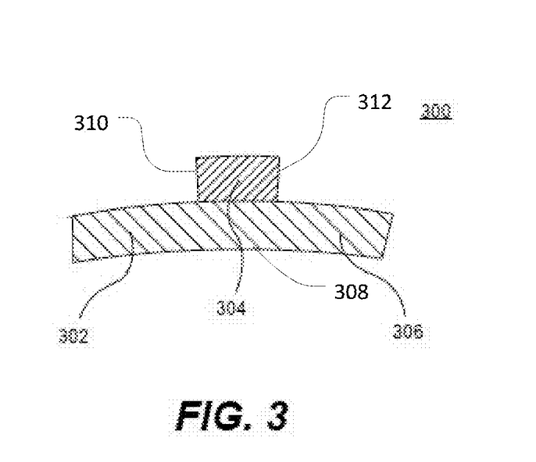
FIG. 3 illustrates side view of an exemplary spacer in accordance with embodiments of the invention.

The groove 110 may be formed by placing a spacer on top of the pile encapsulation jacket 100 before forming the extra layer of laminate 108. The extra layer of laminate 108 may be formed on top of the spacer. A top view of an exemplary spacer 300 is illustrated in FIG. 3. The spacer 300, when viewed from a longitudinal cross-section, may include multiple levels (e.g. sections that each have a particular thickness) such as a first level 304 (or a first section), a second level 302 (or a second section) and a third level 306 (or a third section). The first level 304 may be raised from the second level 302 by a predetermined amount. In some embodiments, the spacer 300 may have a T-profile. The second level 302 and the third level 306 may have the same thickness measured from a bottom surface (e.g. a base) 308 of the spacer 300 while the first level 304 may be thicker than both the second level 302 and the third level 306. A side surface 310 or 312 of the first level 304 raised above the second level 302 or the third level 306 may serve as a stop when the extra layer of laminate 108 is formed a portion (i.e. the second level 302 or the third level 306) of the spacer 300. For example, the extra layer of laminate 108 may only cover the second level 302 (or the third level 308) of the spacer 300 and terminates at the stop (e.g. a side surface 310 or 312 of the first level 304). In some embodiments, the second level may be about about 2 inches wide such that the groove formed between the first layer of the pile jacket laminate and the second layer of the pile jacket laminate is about 2 inches wide.

Figure 4:
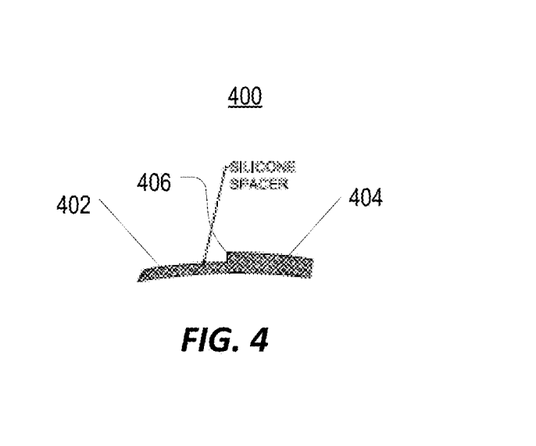
FIG. 4 illustrates side view of another exemplary spacer in accordance with embodiments of the invention.

In some embodiments, the spacer may only have two levels (e.g. two sections each having a particular thickness). An exemplary spacer 400 with two levels is illustrated in FIG. 4. For example, the spacer 400 may have a step profile. The spacer 400 may include a first level 404 (or a first section) and a second level 402 (or a second section). The first level 404 may be raised from the second level 402 by a predetermined amount. A side surface 406 of the first level 402 extending above the second level 402 may serve as a stop when the extra layer of laminate 108 is formed on a portion (i.e. the second level 402) of the spacer 400. That is, the extra layer of laminate 108 only covers the second level 402 of the spacer 400 and terminates at the stop 406.

The stop (e.g. the raised first level 304 of the spacer 300, and/or a side surface 310/312 thereof, or the raised first level 404 of the spacer 400, and/or a side surface 406 thereof) may serve as a measuring station. For example, the stop may be used to determine a cutting location for longitudinally cutting the pile jacket laminate to form the pile encapsulation jacket 100. For example, the pile jacket laminate may be formed as a substantially cylindrical hollow structure with the extra layer of laminate 108 formed thereon. The substantially cylindrical pile jacket laminate may be cut at 1-inch from the stop. In some embodiments, the substantially cylindrical pile jacket laminate may be cut at 1-inch from the stop and at 4-inches from the stop to form the slit 150 illustrated in FIG. 1A.

The spacer 300, 400 may be formed of silicone rubber such that even though the spacer 300, 400 may temporarily adhere (e.g. stick) to an outer surface of the pile encapsulation jacket 100, the spacer 300, 400 can be removed from the outer surface of the pile encapsulation jacket 100 to form the groove 110 when the extra layer of laminate 108 is cured. The spacer 300, 400 does not permanently adhere to the pile encapsulation jacket 100 or the extra layer of laminate 108. In some embodiments, a gel coat may be formed on the exterior surface of the spacer 300, 400. The spacer 300, 400 may be as long as the pile encapsulation jacket 100 such that when the extra layer of laminate 108 is formed on a portion of the spacer 300, 400, the extra layer of laminate 108 extends along the entire length of the pile encapsulation jacket 100.

In addition, the extra layer of laminate is formed on a portion of the spacer up to the stop. Accordingly, the stop enables the extra layer of laminate to have a smooth edge portion 152 as illustrated in FIG. 1A. Thus, the spacer (e.g. the stop of the spacer) further eliminates the need to trim the edge portion of the extra layer of laminate when the spacer is removed.

Figure 5:
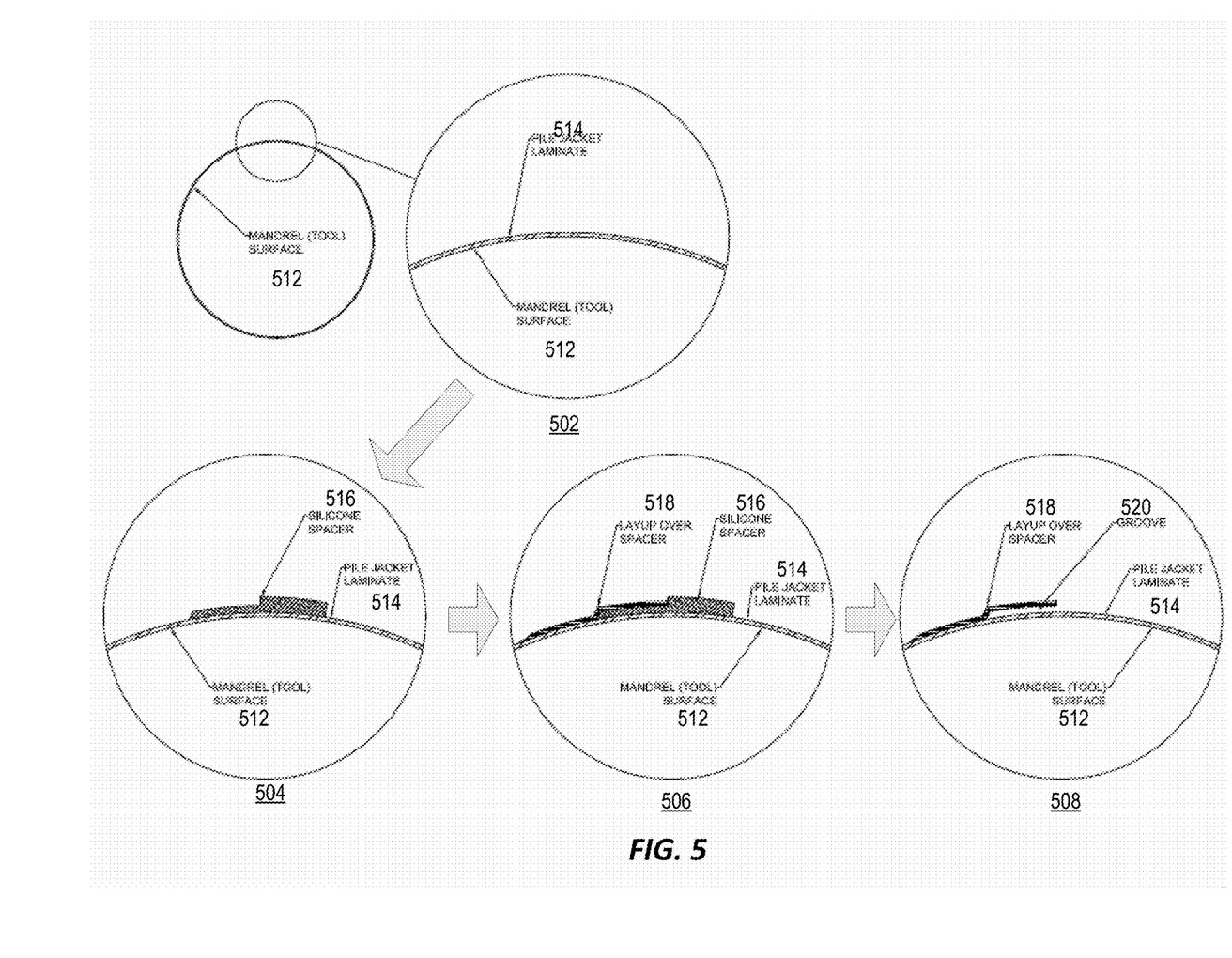
FIG. 5 illustrates a process for making an interlocking joint for a pile encapsulation jacket in accordance with embodiments of the invention.

FIG. 5 illustrates a process for making an interlocking joint for a pile encapsulation jacket in accordance with embodiments of the invention. At 502, a first layer of pile jacket laminate 514 may be formed on an exterior surface of a mandrel 512. The mandrel 512 may be a rotating tool (usually formed of steel) having a substantially rounded and flat surface, and can have any suitable width and/or diameter. In some embodiments, a pre-impregnated layer of fiber-reinforced resin material may be wound on the mandrel 512, and additional resin material(s) may optionally be coated on the fiber-reinforced resin material to form the first layer of pile jacket laminate 514. In other embodiments, a resin material may be coated on the mandrel 512 and a fiber or fabric material may be applied to the resin material on the mandrel. Additional resin material may be coated on the fiber or fabric material to impregnate it. The first layer of pile jacket laminate 514 may include a single layer of fiber-reinforced plastic material or multiple sublayers of such material.

The formed first layer of the pile jacket laminate 514 may include a circumferential surface and may form a cylinder. The first layer of the pile jacket laminate 514 may be partially cured, for example for about 7-10 minutes. When partially cured, the first layer of the pile jacket laminate 514 may have a sticky exterior surface.

In embodiments of the invention, partial curing may include a curing process that will partially harden a resin, but will not fully harden the resin to its final intended hardness. The time and temperature used in the curing process can be chosen by those of ordinary skill in the art and may depend upon the type of resin being cured.

At 504, a flexible spacer 516 may be placed on the first layer of pile jacket laminate 514. In some embodiments, the spacer 516 may be a silicone rubber spacer. Since the surface of the first layer of pile jacket laminate 514 is sticky due to partial curing, the spacer 516 may removably couple (e.g. adhere or stick) to the first layer of pile jacket laminate 514. That is, the spacer 516 may stay in place on the exterior surface of the first layer of pile jacket laminate 514 but is easily removed when the spacer 516 is pulled away.

At 506, a second layer of the pile jacket laminate 518 may be formed on at least a portion of the first layer of pile jacket laminate 514 and a portion of the spacer 516. For example, the spacer 516 may have at least two levels, a first level raised by a predetermined amount from the second level such that the first level is thicker than the second level. The second layer of the pile jacket laminate 518 may be formed on the second level of the spacer 516. The second layer of pile jacket laminate 518 may be formed in the same or different manner as the first layer of pile jacket laminate 514. The second layer of the pile jacket laminate 518 may have a step profile resulting from the shaped of the spacer 516. The second layer of the pile jacket laminate 518 may be cured (e.g., either partially cured, or fully cured).

At 508, the spacer 516 is removed to form a groove 520 on the exterior surface of the first layer of pile jacket laminate 514. In some embodiments, the spacer 516 releases itself from the surface of the first layer of pile jacket laminate 514 when the entire structure is cured. In other embodiments, the spacer 516 may be pulled away with minimal effort. After the spacer 516 is removed, the groove 520 is formed between the first layer of pile jacket laminate 514 and the second layer of pile jacket laminate 518, at the space previously occupied by the spacer 516.

Using the silicone rubber spacer provides a cost-efficient and precise way to form the groove on the pile jackets. Specifically, a same size groove may be efficiently formed on the pile jackets using the above-described technique.

At a later point in time, the first layer of pile jacket laminate 514 may be cut in a longitudinal direction at a predetermined distance from a terminal end of the second layer of pile jacket laminate 518 to form a pile encapsulation jacket, such as the pile encapsulation jacket 100 illustrated in FIG. 1A. The cutting location for the pile jacket laminate may also be determined as a predetermined distance from the stop of the spacer. In some embodiments, a first cut may be performed at 1-inch from the stop of the spacer and a second cut may be performed at 4-inches from the stop of the spacer.

Furthermore, since the extra layer of laminate is formed on a portion of the spacer up to the stop, the stop enables the extra layer of laminate to have a smooth edge portion. Thus, the spacer (e.g. the stop of the spacer) further eliminates the need to trim the edge portion of the extra layer of laminate when the spacer is removed.

In use, the pile encapsulation jacket may be wrapped around a structure (e.g. a pile) and a first longitudinal edge portion of the first layer of the pile jacket laminate may be inserted into the groove to secure the pile encapsulation jacket around the structure. The groove may be formed on the first longitudinal edge portion of the first layer of the pile jacket laminate. In some embodiments, adhesive material may be placed in the groove prior to placing the first longitudinal edge portion of the first layer of the pile jacket laminate into the groove such that the first longitudinal edge portion of the first layer of the pile jacket laminate adheres to an overlapping portion of the opposite longitudinal edge portion of the first layer of the pile jacket. The pile encapsulation jacket may be used, for example, to repair or fortify underwater structures such as bridge legs, underwater portion of piers, jetties or off-shore platforms. For underwater application, once the pile encapsulation jacket is provided around the pile, the bottom surface may be sealed and water remaining between the jacket and the pile may be pumped out. The pile encapsulation jacket may also be used to rehabilitate wooden telephone poles.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

A recitation of "a", "an" or "the" is intended to mean "one or more" unless specifically indicated to the contrary.

What is claimed is:

1. A method for making an interlocking joint for a pile encapsulation jacket, the method comprising:
    forming a first layer of pile jacket laminate on a surface of a mandrel;
    partially curing the first layer of the pile jacket laminate;
    placing a spacer on the partially cured first layer of pule jacket laminate;
    forming a second layer of the pile jacket laminate on at least a portion of the first layer of pile jacket laminate and a portion of the spacer;
    curing the second layer of pile jacket laminate; and
    removing the spacer to form an interlocking joint including a groove, wherein the groove is formed between the first layer of the pile jacket laminate and the second layer of the pile jacket laminate at a space previously occupied by the spacer.

2. The method of claim 1, further comprising:
    cutting the first layer of the pile jacket laminate in a longitudinal direction at a predetermined distance from a terminal end of the second layer of the pile jacket laminate to form the pile encapsulation jacket.

3. The method of claim 1, wherein the spacer includes at least two levels, a first level raised from a second level, wherein the second layer of the pile jacket laminate is formed over the second level of the spacer.

4. The method of claim 3, wherein the second level is about 2 inches wide such that the groove formed between the first layer of the pile jacket laminate and the second layer of the pile jacket laminate is about 2 inches wide.

5. The method of claim 1, wherein a length of the spacer is substantially the same as the length of the pile jacket.

6. The method of claim 1, wherein the spacer removably couples to the partially cured first layer of the pile jacket laminate.

7. The method of claim 1, wherein the spacer has a T-profile.

8. The method of claim 1, wherein the spacer has a step profile.

9. The method of claim 1, wherein the second layer of the pile jacket laminate has a step profile.

10. The method of claim 1, wherein the first layer of the pile jacket laminate or the second layer of the pile jacket laminate includes multiple sublayers of fiberglass.

11. The method of claim 1, wherein the first layer of the pile jacket laminate or the second layer of the pile jacket laminate includes multiple sublayers of resin.

12. A method, comprising:
forming a first layer of pile jacket laminate on a surface of a mandrel;
partially curing the first layer of the pile jacket laminate;
placing a spacer on the partially cured first layer of pule jacket laminate;
forming a second layer of the pile jacket laminate on at least a portion of the first layer of pile jacket laminate and a portion of the spacer;
curing the second layer of pile jacket laminate;
removing the spacer to form an interlocking joint including a groove, wherein the groove is formed between the first layer of the pile jacket laminate and the second layer of the pile jacket laminate at a space previously occupied by the spacer;
cutting the first layer of the pile jacket laminate in a longitudinal direction to form the pile encapsulation jacket, wherein cutting exposes a first longitudinal edge portion and a second longitudinal edge portion opposite from the first longitudinal edge portion, wherein the groove is formed on the second longitudinal edge portion;
wrapping the pile encapsulation jacket around a structure; and
placing the first longitudinal edge portion into the groove to secure the pile encapsulation jacket around the structure.

13. The method of claim 12, further comprising:
providing adhesive material in the groove prior to placing the first longitudinal edge portion into the groove.

14. The method of claim 12, wherein the spacer includes at least two levels, a first level raised from a second level, wherein the second layer of the pile jacket laminate is formed over the second level of the spacer.

15. The method of claim 14, wherein the second level is about 2 inches wide such that the groove formed between the first layer of the pile jacket laminate and the second layer of the pile jacket laminate is about 2 inches wide.

16. The method of claim 12, wherein the spacer removably couples to the partially cured first layer of the pile jacket laminate.

17. The method of claim 12, wherein the spacer and the second layer of the pile jacket laminate have a step profile.

18. The method of claim 12, wherein the first layer of the pile jacket laminate or the second layer of the pile jacket laminate includes multiple sublayers of fiberglass.

19. The method of claim 12, wherein the first layer of the pile jacket laminate or the second layer of the pile jacket laminate includes multiple sublayers of resin.

* * * * *